United States Patent [19]

Münter

[11] Patent Number: 4,534,041
[45] Date of Patent: Aug. 6, 1985

[54] DIGITAL CIRCUIT FOR DETERMINING THE ENVELOPE FREQUENCY OF PCM ENCODED CALL PROGRESS TONES IN A TELEPHONE SYSTEM

[75] Inventor: Ernst A. Münter, Kanata, Canada

[73] Assignee: Northern Telecom Limited, Montreal, Canada

[21] Appl. No.: 528,170

[22] Filed: Aug. 31, 1983

Related U.S. Application Data

[62] Division of Ser. No. 359,896, Mar. 19, 1982, Pat. No. 4,439,639.

[51] Int. Cl.³ ............................................... G06F 15/36
[52] U.S. Cl. ..................................... 375/94; 364/724; 328/134; 340/825.48; 179/84 VF
[58] Field of Search ............... 370/110.3; 455/35, 36, 455/37; 340/825.44, 825.48, 825.71, 825.73; 179/84 R, 84 VF; 328/134, 138; 364/178, 183, 514, 724, 725, 726; 375/94

[56] References Cited

U.S. PATENT DOCUMENTS

| | | | |
|---|---|---|---|
| 3,961,167 | 6/1976 | Mills | 364/724 |
| 4,109,109 | 8/1978 | Molleron | 370/110.3 |
| 4,216,463 | 8/1980 | Backof, Jr. et al. | 328/134 |
| 4,302,817 | 11/1981 | Labedz | 364/724 |
| 4,354,248 | 10/1982 | Conger | 364/724 |
| 4,484,354 | 11/1984 | Bennett | 455/35 |

Primary Examiner—Benedict V. Safourek
Attorney, Agent, or Firm—F. P. Turpin

[57] ABSTRACT

A digital tone detector circuit characterizes the received PCM encoded signals as one of a plurality of call progress tones, voice signals or silence. The PCM signal is linearized and normalized to a predetermined level in a digital automatic gain control circuit which also provides a signal corresponding to the level of the input signal. A first circuit is responsive to the linear signal for providing a count of the zero level traversals incurred by the linear signal. An envelope detector circuit is also responsive to the linear signal for providing a signal representing the envelope frequency thereof. The composite results corresponding to the signal level, the zero-level traversal count, and the envelope frequency are translated in an evaluation logic circuit to provide an output signal representing the identity of the input PCM signal. A microprocessor is responsive to a plurality of the output signals from the evaluation logic circuit for determining the cadence of the received PCM signals.

4 Claims, 10 Drawing Figures

DIGITAL CIRCUIT FOR DETERMINING THE ENVELOPE FREQUENCY OF PCM ENCODED CALL PROGRESS TONES IN A TELEPHONE SYSTEM

This specification has been divided from a patent application by Ernst August Munter with Ser. No. 359,896 filed on Mar. 19, 1982 now Pat. No. 4,439,639.

The invention relates generally to telephone systems and more particularly to a digital circuit and method for the detection of call progress tones therein.

BACKGROUND OF THE INVENTION

In a telephone system, call progress tones are used for indicating to the user the status of his call. Typical signals are labelled audible ringing, dial tone, busy tone, and reorder tone. In the conventional system, these tones are detectable by the user of the system. However, the creation of private networks has resulted in the need for circuitry capable of recognizing these call progress tones since these may not be available at the call originating end of such networks. In addition, since these tones are the basis for billing procedures on these networks, the detection circuits need to be accurate and fast so that the billing period is accurately identified. Furthermore, the proliferation of digital switching systems has created the additional requirement that any such detection circuitry be able to operate directly on pulse code modulated (PCM) signals.

Unfortunately, the North American telephone network does not have a precise tone plan that has been universally adopted. There is therefore a considerable variation in the tone frequencies and cadence employed by various telephone utilities. A comprehensive listing of the various tones may be found in the publication entitled "Notes on the Network" published in 1980 by the American Telephone and Telegraph Company at pages 110 to 119. The most common of the call progress tones are dial tone, audible ringing tone, busy tone, and reorder tone. The precise tone plan specification for the North American network defines these tones as follows, dial tone is a continuous tone having frequencies of 350 and 440 Hz at a level of $-13$ dbm. Audible ringing tone is defined as comprising frequencies of 440 and 480 Hz at a level of $-19$ dbm and a cadence of 2 seconds ON and 4 seconds OFF. Busy tone is defined as having frequency components of 480 and 620 Hz at a level of $-24$ dbm and a cadence of half a second ON and half a second OFF, whereas reorder tone contains the same frequency components at a comparable level but with a cadence of 0.25 of a second ON and 0.25 of a second OFF. Other frequencies and levels are generated by older equipment which does not follow the precise tone plan; these tones are either formed as dual frequency tones or as amplitude modulated signals where a higher frequency is modulated by a lower frequency.

It is therefore desired to provide a circuit for the automatic recognition and identification of call progress tones on the telephone network which is accurate, reliable, fast and economical. It is further desired to provide such a circuit that operates on digital signals.

In the past, there has been a wide variety of methods proposed for solving this problem including digital filtering and spectral analysis of the signals. More recently, there have been proposals that provide somewhat simpler circuitry to recognize the basic call progress tones. The first of these is known as the energy system and is based on the recognition of energy bursts in the signal, whereby counting the number of "tone bursts" of the signal in the specified period indicates the identity of the tone. Effectively, this method relies on the detection of the cadence of the signal. A second method, relies on the incidence of zero crossings by the signal being detected. However, the known methods of detection have been found to be inadequate especially in the identification of dual-frequency tones.

THE INVENTION

The invention provides a circuit for the detection and identification of call progress tones appearing on telephone lines and which is both fast and reliable as well as being accurate. The circuit of the invention operates on pulse code modulated signals and is therefore ideally suited for use in contemporary digital systems such as that described in U.S. Pat. No. 4,213,201 entitled "Modular Time Division Switching System" and assigned to the present assignee. The tone detection service circuit of the invention operates on the PCM bit stream to identify call progress tones such as audible ringing, busy tone, reorder tone, dial tone, as well as voice and silence periods.

The circuit performs a frequency and envelope analysis on the digital signal received from a terminating trunk or the like. The detector is based on the observation that when dual frequency components exist in a tone, the waveform of the tone is complicated and has an envelope which represents the difference frequency between the two frequencies of the tone. The higher frequency component is recognizable through the amplitude modulated peaks, whereas the envelope frequency when subtracted from the higher frequency results in the lower frequency component.

In accordance with the invention there is provided a first means for measuring the level of the tone which is linearized and normalized to a 5 bit PCM signal. A second means is responsive to the normalized signal for determining the higher frequency component of the tone by counting the number of zero crossings in a predetermined period. A third means is also responsive to the normalized signal for determining the envelope frequency of the tone. The composite results available from the first, second and third means represent the identity of the call progress tone being analyzed. A translation circuit is responsive to the composite results for providing a signal which represents the identity of the call progress tone. This signal may then be applied to a suitably programmed microprocessor for further processing and cadence evaluation.

From another aspect, the invention provides a method for determining the identity of a signal appearing on a telephone line in a telephone system. The input signal is linearized and normalized to provide a 5 bit PCM signal comprising a 4 bit magnitude signal and a sign bit. The higher frequency component of the signal is then determined by counting the incidence of zero level traversals by the linearized signal. Concurrently, the envelope frequency of the signal is determined. The composite results obtained by measuring the level of the signal, determining the higher frequency component signal, and determining the envelope frequency of the signal determine the identity of the PCM tone signal appearing on the telephone line. The identity of the signal may be obtained by translating the composite results to provide a single signal which identifies the signal appearing on the telephone line as a call progress tone or voice or silence. The cadence of the signal appearing on the telephone line may then be determined by generating and evaluating a contiguous plurality of the single signals.

In accordance with a further aspect of the invention there is provided a novel circuit and method for detecting the envelope of a signal. A normalized and linearized PCM signal is rectified and applied to a threshold circuit having lower and upper reference thresholds. The former is at a level above the zero base whereas the latter is at a level lower than the maximum amplitude of the envelope being detected. Since the input signal exhibits an envelope characteristic the output of the threshold memory is a chopped pattern. The chopped signal is then filtered through a threshold filter circuit which acts as a window circuit to integrate the chopped signal thereby creating a square wave having a frequency corresponding to that of the envelope frequency. The threshold filter circuit includes a majority logic circuit responsive to the chopped signal for enabling a counter circuit which provides an output signal corresponding to the envelope frequency.

In accordance with a still further aspect of the invention, there is provided a digital automatic gain control circuit responsive to companded pulse code modulated signals for providing linearized and normalized PCM signals. The input PCM signals are translated to linear PCM signals in a read-only-memory (ROM) which contains a plurality of pages each representing a different loss level for the input signals. A control circuit is responsive to the linear PCM signals to vary the ROM page address until the output linear PCM signal has been normalized to a predetermined level.

An example embodiment of the invention will now be described in conjunction with the drawings in which:

FIG. 2b is a transfer characteristic of the circuit shown in FIG. 2a;

FIG. 3b shows a waveform illustrating the operation of the circuit of FIG. 3a;

FIG. 4a is a block circuit diagram of the envelope detector shown in FIG. 2a;

FIG. 4b illustrates a plurality of waveforms taken at various points in the circuit of FIG. 4a;

Figure 1:
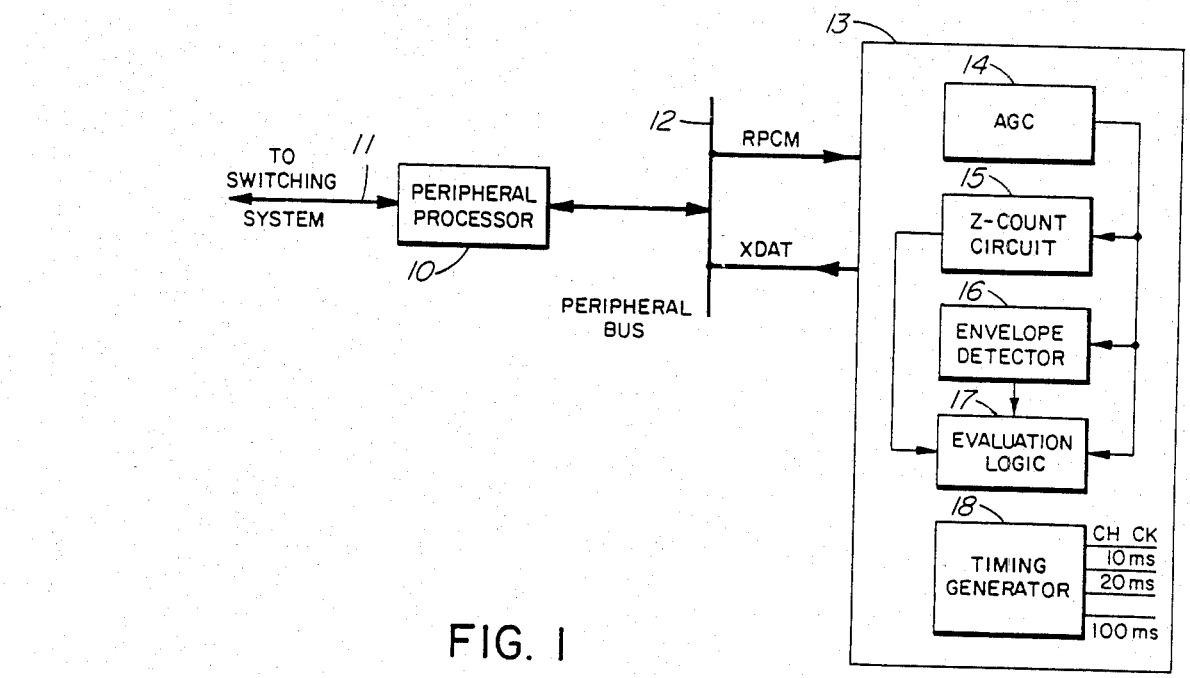
FIG. 1 is a block circuit diagram of a digital tone detector in accordance with the invention.

FIG. 1 illustrates a peripheral module of a fully digital telephone switching system such as may be used in the above referenced U.S. Pat. No. 4,213,201. A peripheral processor 10 of the peripheral module communicates with the switching system via a transmission facility 11 and with peripheral or service circuits via a peripheral bus 12. A digital tone detector 13 is shown to comprise an automatic gain circuit (AGC) 14, a zero count detector 15, an envelope detector 16, an evaluation logic circuit 17 and a timing generator 18.

In operation, the peripheral processor 10 receives PCM signals on transmission facility 11 and applies the signal to the tone detector 13 via the peripheral bus 12 (RPCM). The tone detector 13 manipulates the received PCM signals and provides the processor 10 with the identity (XDAT) of the received signals. The peripheral processor 10 verifies the identity of the signals by performing a cadence check and transmits the required information to the central processor of the switching system on the transmission facility 11. As described in the priorly referenced patent, the processor 10 is adapted to receive and transmit 32 channels of time divided PCM information. Two of these channels are used for control information whereas the remainder serve to handle 30 channels of data. Hence, the tone detector 13 may be used to detect the identity of tones appearing in up to 30 different channels.

Since the detection of tones appearing on thirty channels or trunks, is merely a question of performing the same functions 30 times per frame, the invention will be first described in relation to the detection of a tone signal on one channel. Also, the embodiment of the invention described herein may be realized using commercially available off-the-shelf components.

Figure 2A:
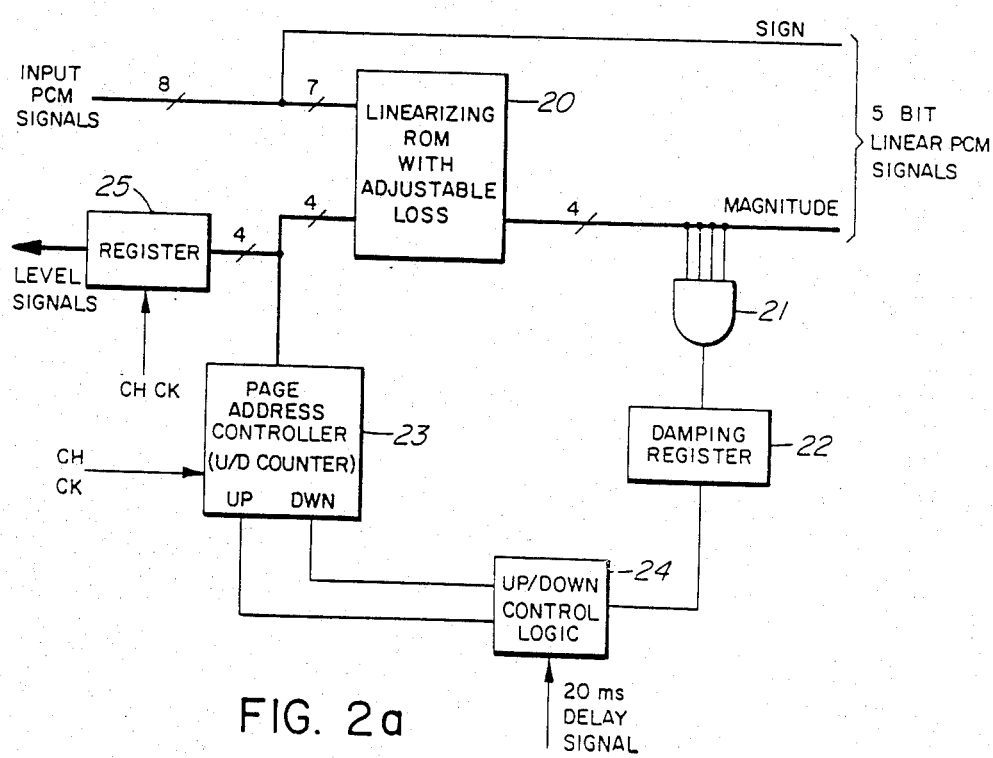
FIG. 2a is a block circuit diagram of the AGC circuit shown in FIG. 1.
Figure 2B:
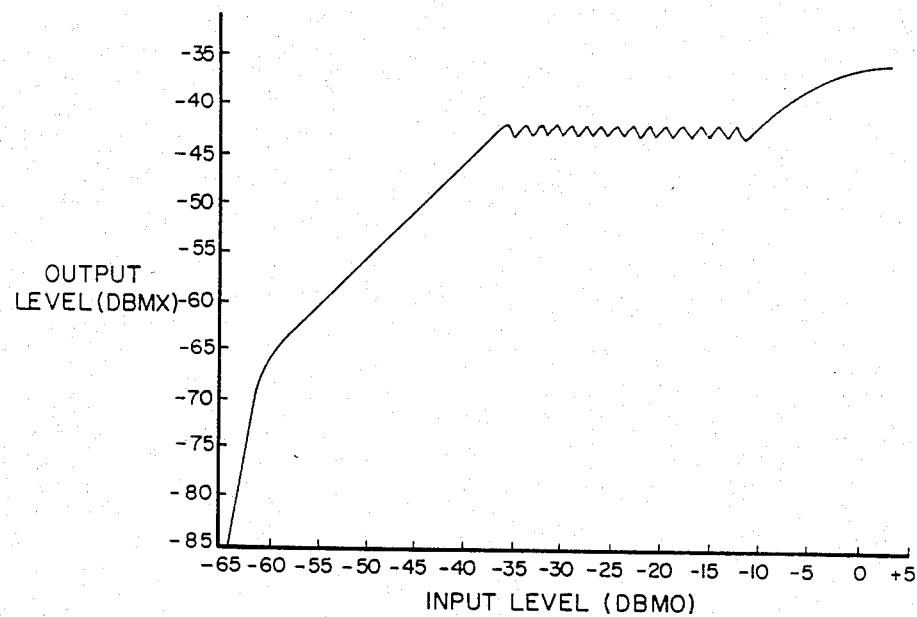

FIG. 2a of the drawings illustrates a fully digital automatic gain circuit (AGC) for use in the tone detector shown in FIG. 1, whereas FIG. 2b illustrates the transfer characteristic for the circuit of FIG. 2a. A read-only-memory (ROM) 20 is a linearizing circuit providing adjustable loss for the input PCM signal. The magnitude portion (7 bits) of the input signal is linearized to a 4-bit signal whereas the sign bit of the input signal is made to appear at the output of the AGC circuit unaltered. The output signal of the AGC circuit therefore provides a 5 bit linear PCM signal.

The circuit of FIG. 2a is basically a digital level meter and an automatic gain control circuit whose function is to provide a standard size signal for the zero count circuit and envelope detector circuits. The level of the input signal corresponds to the page address and is available at the output of register 25. The ROM 20 provides for a range of approximately 27 db of loss divided into 16 increments of 1.7 db each. The memory is therefore divided into 16 pages of 128 levels each.

The transfer characteristic of FIG. 2b shows that an input signal having a level of from −10 to −37 dbmo will be normalized to an output signal having a level of approximately −43 dbmx. Of course, it should be understood that the range of these levels is arbitrary and may be varied depending on the expected characteristics of the input PCM signal and the required level of the linear PCM output signal. This may be accomplished simply by providing a ROM containing the appropriate translation data.

The linearizing and loss function of ROM 20 is controlled by an AND gate 21, a damping register 22, a page address controller 23, and up/down control logic 24. The page controller 23 may simply be an up/down counter adapted to provide a 4 bit address at its output. The circuit is clocked at the frame rate (8 KHz) and is enabled by up/down signals from control logic 24. As the count of the page address controller 23 is increased, the new address selects a page of the ROM which provides increased loss to the input signal and conversely, counting down decreases the loss applied to the input signal.

If the input PCM signal exceeds the signal size expected for it (the selected page of ROM), the output of the ROM will be Hexadecimal 'F' (all ones). This state will be detected by NAND gate 21 and through damping register 22 will cause the up/down control logic to provide an up-count signal to the page address controller 23 thereby increasing the address to the ROM by one count. If the input PCM signal does not exceed the signal expected for it, the 4 bit magnitude word will not be all ones and the page address will remain constant. However, every 20 milliseconds, a decay signal applied to the control logic 24 will cause the counter 23 to be decremented if the signal at the output of NAND gate 21 is a zero. This allows the circuit to track decaying signals. In this way, the AGC circuit will normalize any input signal within the range of the circuit by applying more loss to a larger signal and will track decaying signals by decreasing the loss one step every 20 milliseconds. Input signals having a level higher than the range permitted by the circuit will be clipped. Also, short noise pulses are rejected by the AGC circuit by virtue of the inherent controlled attack time (13 db/millisecond) of the circuit.

Since the circuit of FIG. 2a functions as a peak reading voltmeter with a fast attack and slow decay time, noise signals riding on the input signal can result in sporadic high level readings. This may be prevented by using a damping register 22 for storing one or more One signals provided at the output of NAND gate 21 until a plurality (e.g. 4) of these signals have occurred. Therefore, the signal at the output of the gate 21 will cause the control logic to issue an up-count signal only if 4 consecutive all ones condition have occurred. If not, the register is simply reset. Of course, the register 22 may be designed to store any number of "one" signals from gate 21, depending on the expected level of noise. In addition to supplying a 5 bit PCM signal which is the linearized and normalized version of the input signal, the AGC circuit of FIG. 2a also provides the last count or page address as a measure of the level of the input signal to the evaluation logic.

Figure 3A:
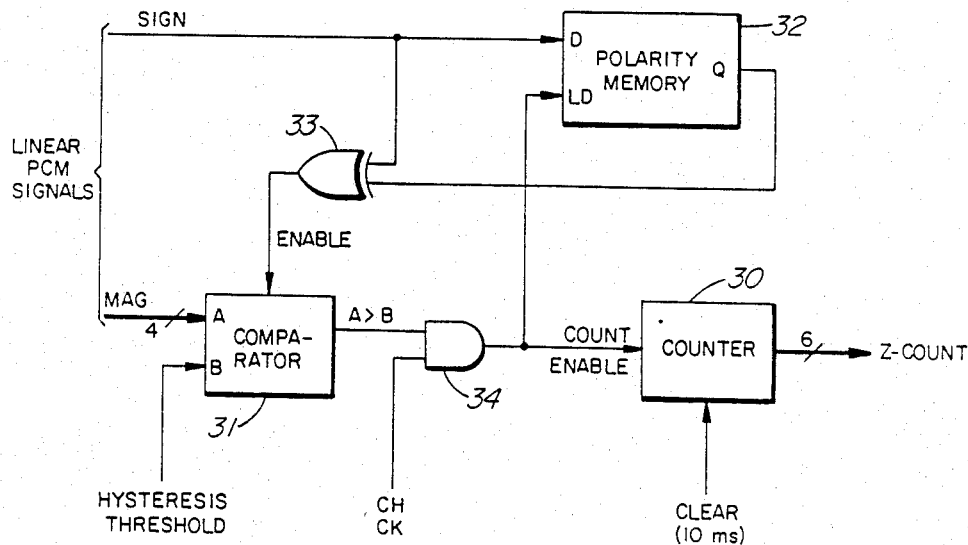
FIG. 3a is a block circuit diagram of the Z-count detector shown in FIG. 1.
Figure 3B:
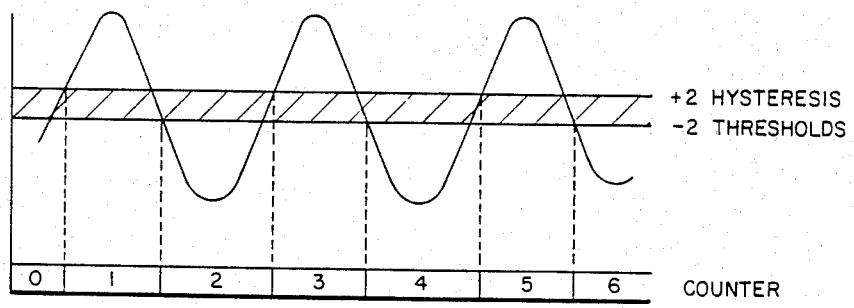

FIGS. 3a and 3b of the drawings illustrate the circuit and operation of Z-count circuit 15. The circuit counts the number of zero crossings traversed by the 5-bit linear PCM signal from the AGC circuit of FIG. 2a in a 10 millisecond period. The count is made by counter circuit 30. At the beginning of a 10 millisecond period, the count 30 is cleared and the counter is incremented by one count each time that a zero crossing is detected. The incoming signal is compared to hysteresis threshold ($\pm 2$) by comparator 31 and the sign bit from the previous frame is stored in polarity memory 32. The sign bit from the previous frame is compared to the new sign bit by the exclusive OR gate 33 which enables comparator 31 if the new and previous sign bits are different. Therefore, the counter will be incremented by the output of gate 34 if the new and previous sign bits are different and if the threshold levels are exceeded. Counter 30 provides a 6 bit parallel output signal for use by the evaluation logic. This signal or Z-count corresponds approximately to the higher frequency of a dual frequency tone or the carrier frequency of an amplitude modulated tone signal.

Figure 4A:
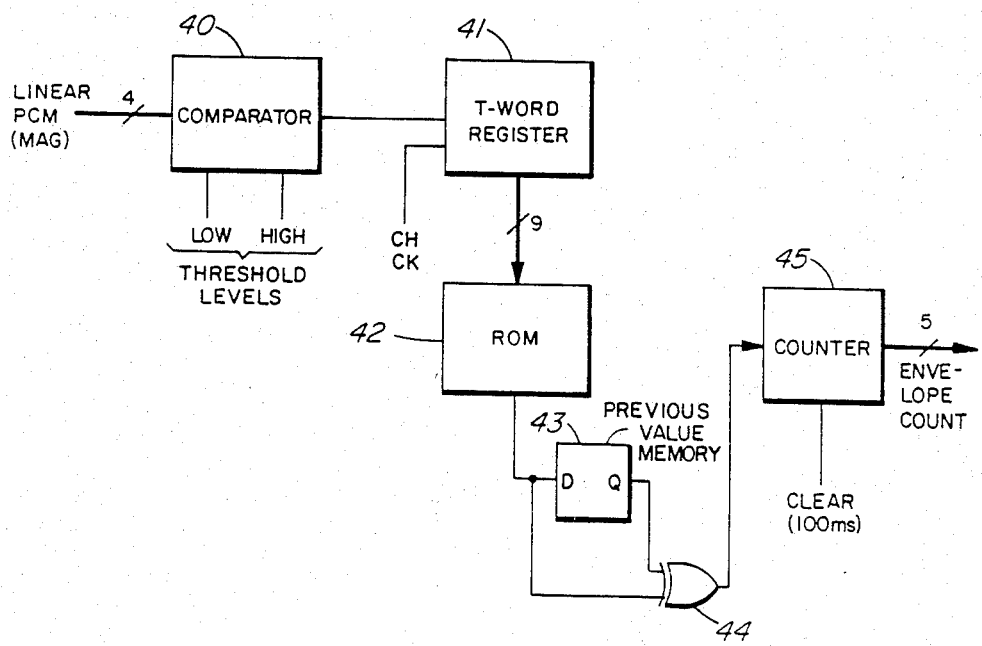
Figure 4B:
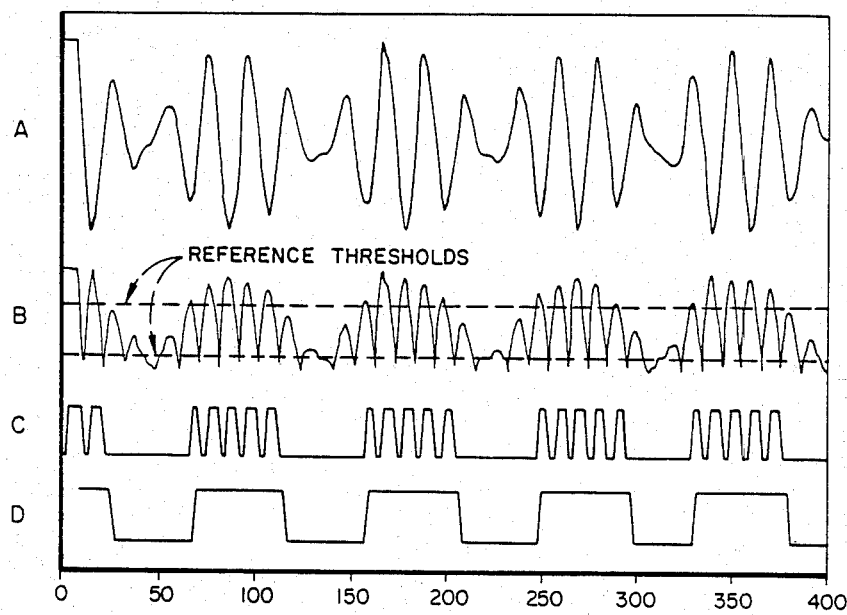

FIGS. 4a and 4b illustrate the circuit and operation of a digital envelope detecto; in accordance with the invention. The envelope detector is used to determine the frequency of the envelope of a dual frequency tone and provides an output signal every 100 milliseconds. The operation of the envelope detector is based on the observation that the amplitude envelope of a two frequency signal with approximately equal level of the two frequencies represents the difference frequency. In effect, the signal looks like an amplitude modulated signal, with the modulation frequency being the difference frequency.

Waveform A of FIG. 4b is the analog representation of the linear PCM signal appearing at the input of the circuit. In order to detect the envelope of the signal, the 5 bit PCM signal is first rectified. This is achieved simply by ignoring the sign bit as shown in waveform B of FIG. 4b. The rectified signal is applied to a comparator 40 having low and high reference threshold levels that give a Schmitt trigger action. That is, high signals must reach a low threshold of less than a predetermined amount (e.g. 4) before being considered a low and low signals must reach a high threshold of greater than a second predetermined amount (e.g. 9) before being considered a high signal. This comparison has the effect of truncating the input signal to provide a chopped signal as shown in waveform C of FIG. 4b. It has been found that differential thresholds of approximately one half full scale of the input signal provide satisfactory results.

The output of comparator 40 is fed to a threshold filter comprised of a threshold register 41 and a ROM 42 to generate a square waveform (FIG. 4b, waveform D) having a frequency corresponding to the envelope frequency of the input signal. Nine consecutive results from the comparator 40 are stored in T-word register 41 which may conveniently be a serial to parallel converter. On the occurrence of the ninth comparison, the output of the register 41 is presented as an address to ROM 42 which operates as a majority logic circuit. That is, the ROM output is a one if three or more of its nine inputs are ones. The previous ROM output is stored in a flip-flop 43 and is compared with the new value by the exclusive-OR gate 44 which functions to increase the count of counter 45 if the previous and new values are different. Every 100 milliseconds, the envelope or E-count is made available to the evaluation logic and the envelope detector circuit is reset to indicate the beginning of the next 100 millisecond window. As discussed above, the envelope frequency measured over a fixed window gives a number proportional to the difference in frequencies contained in a dual frequency tone.

Figure 5:
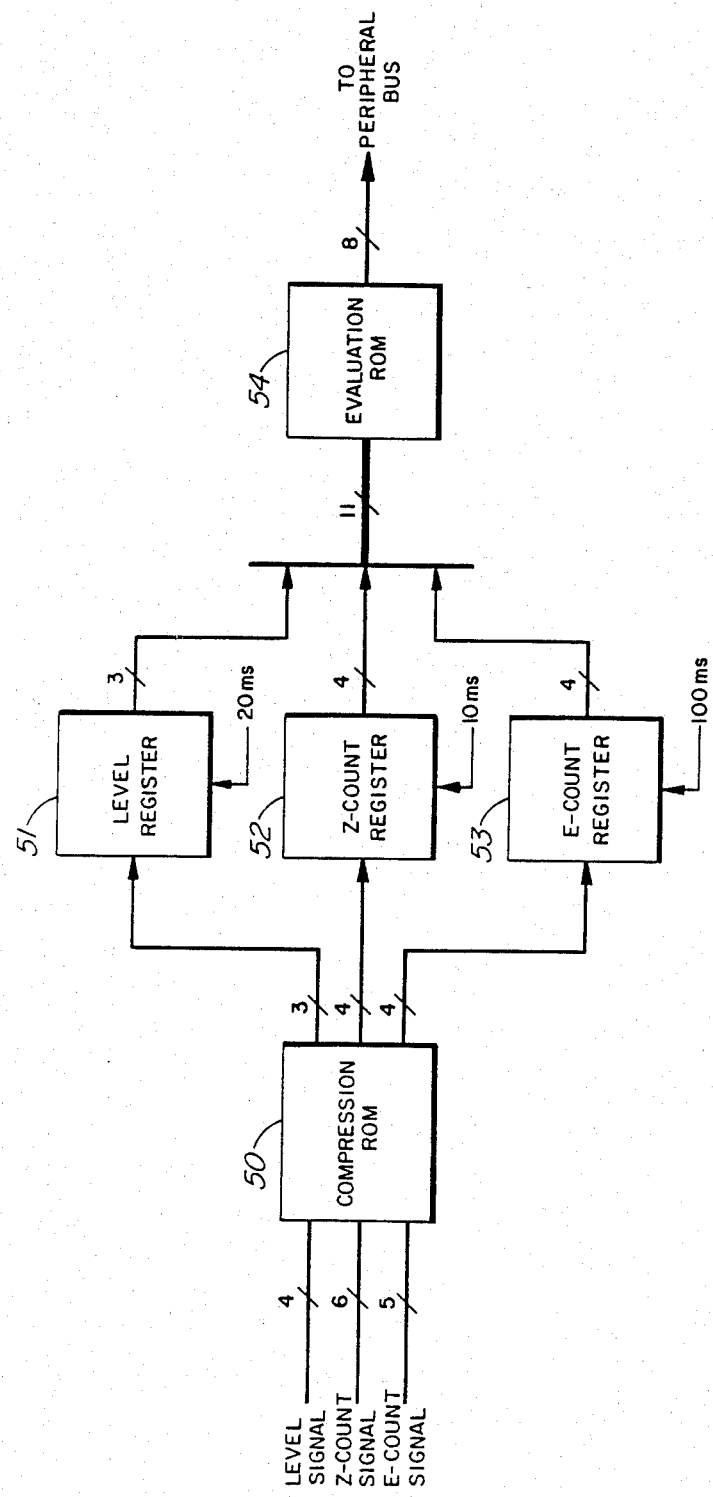
FIG. 5 is a block circuit diagram of the evaluation logic circuit shown in FIG. 1.

The information available from the AGC circuit, the Z-count circuit, and the envelope detector circuit characterizes the received PCM signal with respect to level, zero crossing count, and envelope frequency count. These characterizations comprise a total of 15 bits which are available at different time periods. The level signal from the AGC circuit is a 4 bit signal generated every 125 $\mu$sec., the Z-count signal from the zero crossing circuit is a 6 bit signal available every 10 milliseconds whereas the envelope frequency count from the envelope detector is a 5 bit signal available every 100 milliseconds. Since each audible tone comprises a range of characterizations, the 15 bits of information comprising each characterization may be compressed to provide a more easily handled signal. FIG. 5 illustrates an evaluation logic circuit which operates on the raw data generated by the above detector and counter circuits to produce a code that indicates the type of signal or tone currently being received. Each completed count, as it is read from the respective circuit is presented to the compression ROM 50 which scales it down in order to be represented by a smaller number of bits by excluding invalid (out-of-range) codes for the tones expected for decoding, and combining equivalent values or counts into single codes. The level, Z-count, and E-count outputs are compressed to 3, 4, and 4 bits respectively in ROM 50 and are respectively latched into registers 51, 52, and 53. All of this data appearing at the output of registers 51 to 53 is presented in parallel to an evaluation ROM 54. The evaluation ROM is mapped so that a code corresponding to the signal represented by the raw data appears at the output of the ROM. The same code is used to indicate a tone over its expected range of level, Z-count, and envelope count taking into accunt network loss, frequency tolerances, and edge-effects of the windowing process. This code may then be gated to the peripheral processor on the XDAT link of the peripheral bus at the appropriate time.

The output signal from the evaluation ROM indicates the identity of the input PCM signal to the tone detector. However, if the detected level is less than −35 dbm (lowest level detectable by the AGC) then the output code indicates that the line being measured is silent. In fact, if the measured level corresponds to page 0 or 15 of the ROM 20, the signal is considered to be of an indeterminate level and therefore outside its normal range. Various other codes indicate the type of signal being detected, such as audible ringing, busy/reorder tone, or dial tone. In addition, if the signal being detected cannot be qualified as a recognizable tone, the output signal from the evaluation ROM indicates that it is a voice signal. It should also be recognized that since the Z-count and envelope detector circuits operate during real time windows (10 ms and 100 ms respectively) their frequency resolution is approximately 50 Hz and 5 Hz respectively. However, this is of no consequence since the tones being detected are separated in frequency by more than the frequency resolution of this circuit.

Figure 6:
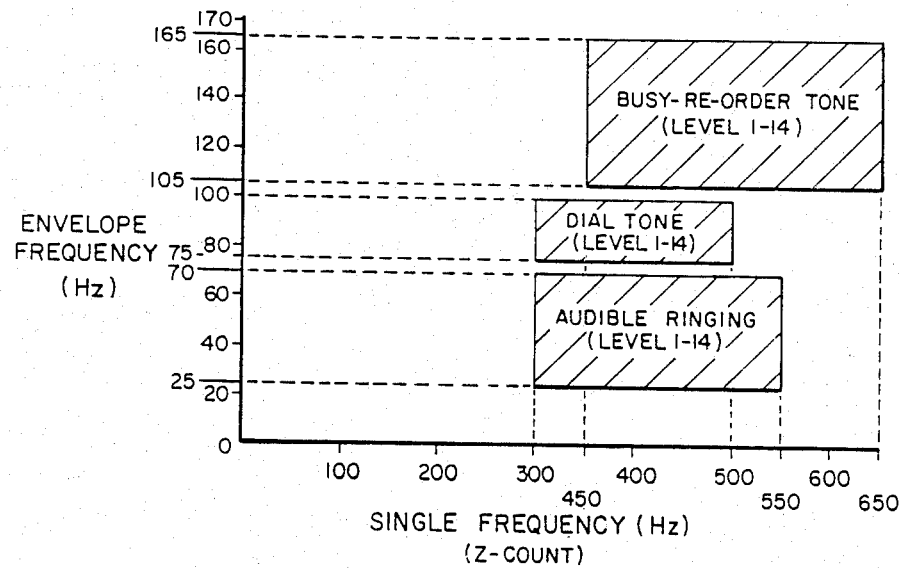
FIG. 6 is a translation diagram.

FIG. 6 illustrates a translation diagram or map for the evaluation ROM 54. Audible ringing is detected if the Z-count corresponds to a frequency between 300 Hz and 550 Hz, the envelope frequency is between 25 Hz and 70 Hz, and the level is within range. Dial tone is detected if the Z-count corresponds to a frequency between 300 Hz and 500 Hz, the envelope frequency is between 75 Hz and 100 Hz and the level is within range. Busy-reorder tone is detected if the Z-count corresponds to a frequency between 350 Hz and 650 Hz, the envelope frequency is between 105 Hz and 165 Hz, and the level is acceptable. As can be seen from FIG. 6, the invention provides a three-dimensional characterization for a tone.

It should be recognized that other tones may be detected. All expected detectable tones may be classified, and a look-up table prepared which maps all acceptable detector combinations into tone identities as above. All unclassified combinations exceeding a minimum threshold may be considered as speech and mapped into a single code. Similarly, all signals below a minimum threshold classify the channel as quiet.

The peripheral processor 10 receives the identification code from the evaluation ROM 54 and performs verification of the identity of the tone by operating on the signals in real-time to ensure that the identities being received are consistent with the expected cadence for the tones. That is, if successive codes are received for audible ringing, it is expected that the tone will display a 2 second ON, 4 second OFF characteristic. Similarly, the processor verifies that a busy tone code exhibits the characteristic 0.5 seconds ON and 0.5 seconds OFF cadence and that a dial tone identification is a continuous tone. Cadence determination is especially useful in cases where the characterizations provided by the AGC, Z-count and envelope detector circuits locate the detected signal at the boundaries of the maps shown in FIG. 6 or when it is desired to differentiate between busy tone and reorder tone.

A signal representing the identity of a tone appearing on any one channel is available at the output of the evaluation ROM 54 every 100 milliseconds. However, intermediate results from the AGC circuit 14 and the Z-count circuit 15 may be made available from the level register 51 and Z-count register 52 by enabling them at their respective intervals of 125 $\mu$sec. and 10 milliseconds. Similarly, it may be desirable, to obtain the raw data from the AGC, the Z-count circuit and the envelope detector for maintenance purposes. This data may conveniently be obtained at the input of the compression ROM 50.

Figure 7:
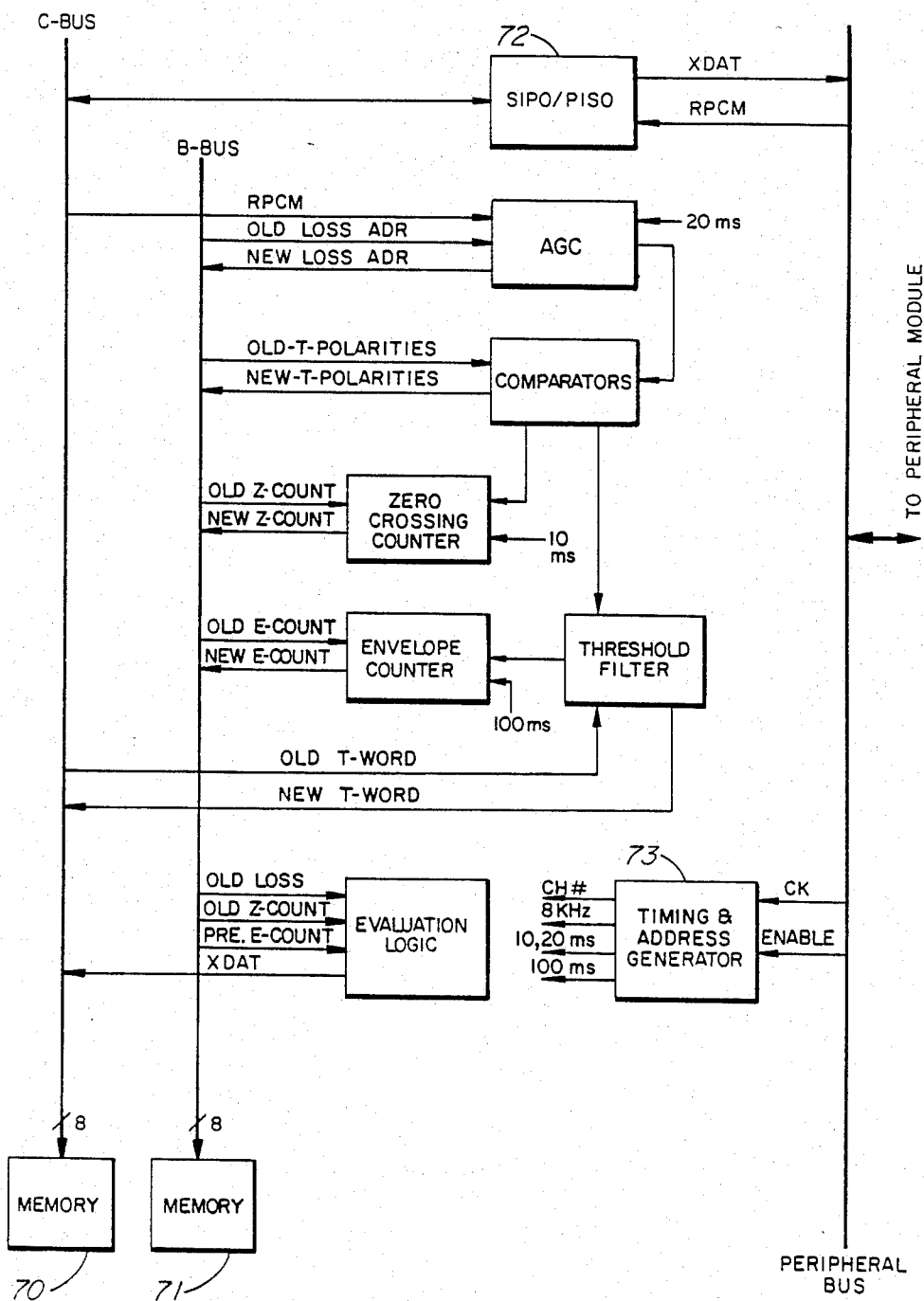
FIG. 7 is a block diagram of a multiple channel tone detector in accordance with the invention.

FIG. 7 is a block circuit diagram illustrating how the tone detector of FIG. 2a may be connected for multiple channel service. As mentioned above, the tone detector circuit communicates with the processor of the peripheral module via the peripheral bus on a time division basis. The communication link comprises 32 time divided channels, two of which are used for control signals. Therefore, the tone detector may be employed to serve 30 channels each of which is subdivided into ten bit times.

Since the tone detector operates in real time on voice frequency signals, the time period required to identify a tone is much longer than the period of a frame (125 $\mu$sec). Therefore, the progressive results of the detection must be stored during the inter-frame periods. This is achieved by using a pair of internal buses C-bus and B-bus, a pair of memories 70 and 71 and a register 72 which is a serial in/parallel out and parallel in/serial out device. Generally, the register 72 is used for the bidirectional transfer of information from the peripheral bus to memory 70 via the C-bus. The B-bus is used for the bidirectional transfer of inter-frame progressive results between the memory 71 and the tone detector circuitry. The 10 bit clock periods of each channel are used to control these bidirectional transfers of information.

The timing signals necessary to the operation of the tone detector may be derived from clock and enable signals on the peripheral bus by timing and address generator circuit 73. The remainder of the circuits of FIG. 7 are identical to those illustrated in FIGS. 2 to 5 with the addition of necessary timing signals to provide the time shared operation of the tone detector.

There has been described a tone detector for call progress tones which is fully digital and which is fast and accurate as well being suitable to serve a large number of PCM channels in a time-division system. The circuit described herein is ideally suited to the detection of a wide range of tones and the necessary modifications to that end may be implemented without departing from the spirit of the invention.

What is claimed is:

1. A digital envelope detector circuit for determining the envelope frequency of a PCM encoded call progress tone in a telephone system comprising, circuit means for converting the PCM signal to a linear PCM signal having a sign bit and a magnitude portion and for normalizing the PCM signal to a predetermined level, a comparator circuit responsive to the magnitude portion of the linear PCM signal and to upper and lower threshold reference signals for providing a chopped signal, a threshold filter responsive to the output signal of the comparator circuit for generating a bilevel signal having a frequency corresponding to the envelope frequency of the linear PCM signal, and a counter circuit responsive to the bilevel signal and to timing signals for counting in a predetermined period of time the transitions between low and high levels of the bilevel signal, the count signal from the counter corresponding to said envelope frequency.

2. A digital envelope detector circuit as defined in claim 1 wherein the difference in level between the lower and upper threshold reference levels is approximately equal to one half the maximum amplitude of the linear PCM signal and wherein the lower threshold reference level is above the zero level.

3. A digital envelope detector circuit as defined in claim 2 wherein the threshold filter comprises a register circuit for storing a plurality of results from the comparator circuit, and a majority logic circuit responsive to said plurality of results for providing an output signal having a predetermined level only if a predetermined number of the signals at its input are at approximately the said predetermined level.

4. A digital envelope detector circuit as defined in claim 3 wherein the majority logic circuit is a read-only-memory.

* * * * *